United States Patent
Yang

(10) Patent No.: US 7,607,505 B2
(45) Date of Patent: Oct. 27, 2009

(54) ENERGY STORAGE TYPE OF DIFFERENTIAL MIXED POWER DISTRIBUTION SYSTEM

(76) Inventor: Tai-Her Yang, No. 59, Chung Hsing 8 St., Si-Hu Town, Dzan Hwa (TW)

( * ) Notice: Subject to any disclaimer, the term of this patent is extended or adjusted under 35 U.S.C. 154(b) by 231 days.

(21) Appl. No.: 11/202,240

(22) Filed: Aug. 12, 2005

(65) Prior Publication Data
US 2007/0095592 A1     May 3, 2007

(51) Int. Cl.
*B60K 17/356* (2006.01)
*B60K 6/00* (2007.01)

(52) U.S. Cl. .................. 180/242; 180/247; 180/245; 180/65.2; 180/65.3

(58) Field of Classification Search .......... 180/242, 180/247, 245, 65.2, 65.3
See application file for complete search history.

(56) References Cited

U.S. PATENT DOCUMENTS

| | | | | |
|---|---|---|---|---|
| 5,346,031 A | * | 9/1994 | Gardner | 180/179 |
| 5,562,566 A | * | 10/1996 | Yang | 477/3 |
| 6,205,379 B1 | * | 3/2001 | Morisawa et al. | 701/22 |
| 6,401,854 B2 | * | 6/2002 | Yano et al. | 180/242 |
| 6,578,681 B1 | * | 6/2003 | Raad | 188/267 |
| 6,781,251 B2 | * | 8/2004 | Takaoka et al. | 290/40 C |
| 6,857,985 B2 | * | 2/2005 | Williams | 477/5 |
| 2001/0042649 A1 | * | 11/2001 | Maeda et al. | 180/65.4 |
| 2004/0222029 A1 | * | 11/2004 | Shigeta et al. | 180/245 |
| 2005/0284683 A1 | * | 12/2005 | Matsuda | 180/242 |
| 2006/0266569 A1 | * | 11/2006 | Fujiwara et al. | 180/65.2 |

* cited by examiner

Primary Examiner—Paul N Dickson
Assistant Examiner—Marlon A Arce
(74) Attorney, Agent, or Firm—Rabin & Berdo, P.C.

(57) ABSTRACT

An energy storage type of differential mixed power distribution system to drive an all wheel driving carrier; a revolution output end of an internal combustion engine (or any other revolution power source) to drive the front-end load through an intermediate transmission and control interface device, and to also drive an input end of the energy storage type of differential mixed power device to output kinetics to further drive the rear-end load; and an electro-mechanical unit functioning as a generator and a motor being disposed in the energy storage type of differential mix power device to regulate the power distribution between the front-end and the rear-end loads by controlling the electro-mechanical unit to operate as a motor or as a generator.

10 Claims, 2 Drawing Sheets

ENERGY STORAGE TYPE OF DIFFERENTIAL MIXED POWER DISTRIBUTION SYSTEM

BACKGROUND OF THE INVENTION (a) Field of the Invention

The present invention is related to an energy storage type of differential mixed power distribution system, and more particularly to one that provides real time power distribution of for the kinetics to drive front-end load and rear-end load by an All Wheel Driving carrier for promoting drivability and drive safety under severe road and weather conditions.

(b) Description of the Prior Art

Conventional all wheel driving (AWD) is generally referred to four wheel driving, respectively two front wheels and two rear wheels; two front and one rear, or one front wheel and two rear wheels driving; or six-, even up to eight-wheel driving with additional rear wheels. Currently AWD is roughly classified into two systems:

(1) Full Time Driving: the engine power drives both of the front and the rear wheels in full time, and an additional differential damper such as the VW's SYNCRO is each disposed between the power source and the motive power side, as well as the power source and the rear wheel set. The advantages of this pattern include that both of the front and the rear wheels are given driving power and good driving performance while flaws including greater power loss and higher fuel consumption are observed.

(2) Real Time Driving: in this pattern, a controllable clutch subject to mechanical, electromagnetic, or fluid force is disposed between the rear wheels and the power source; when driving warrants, the clutch is closed up through the control by manual or automatic detection to drive the rear wheels, otherwise the front-drive takes over in case of general road conditions to save fuel consumption. However, this pattern, either in manual or automatic control mode, an immediate response is prevented when the road condition warrants since there is a slight delay in the timing for the rear wheels to generate kinetics.

(3) Alternatively, an intermediate differential wheel set is provided between the front and the rear wheels; however, the flaw of this pattern is that either differential output end skids, the other differential output end loses its power. That is, if the front wheel skids, the rear wheel is deprived of its power.

All those three patterns described above share the common flaw that once either wheel set skids, the other wheel set loses its power. If an additional anti-skid damper is mounted, it means more lose of power, accelerated temperature rise to the mechanical parts, and significant drop of power performance to result in:

(1) In case of bumpy road condition, the rear wheels are prevented from engaging in asynchronous drive with the front wheels, for example, under circumstances when the rear wheels must run faster than the front wheel do.

(2) In case of climbing a slope, or upon starting up under heavy load, controlling the rear wheels to produce power greater than that by the front wheels fails.

Distribution of power for the front and the rear wheels at random is impossible.

SUMMARY OF THE INVENTION

The primary purpose of the present invention is to provide an energy storage type of differential mixed power distribution system to drive an all wheel driving carrier. Wherein, the revolution output end of an internal combustion engine (or any other revolution power source) drives the front-end load through an intermediate transmission and control interface device; and drives an input end of the energy storage type of differential mixed power device to output kinetics to further drive the rear-end load. An electro-mechanical unit functioning as a generator and a motor is disposed in the energy storage type of differential mix power device to regulate the power distribution between the front-end and the rear-end loads by controlling the electro-mechanical unit to operate as a motor or as a generator.

DETAILED DESCRIPTION OF THE PREFERRED EMBODIMENTS

Figure 1:
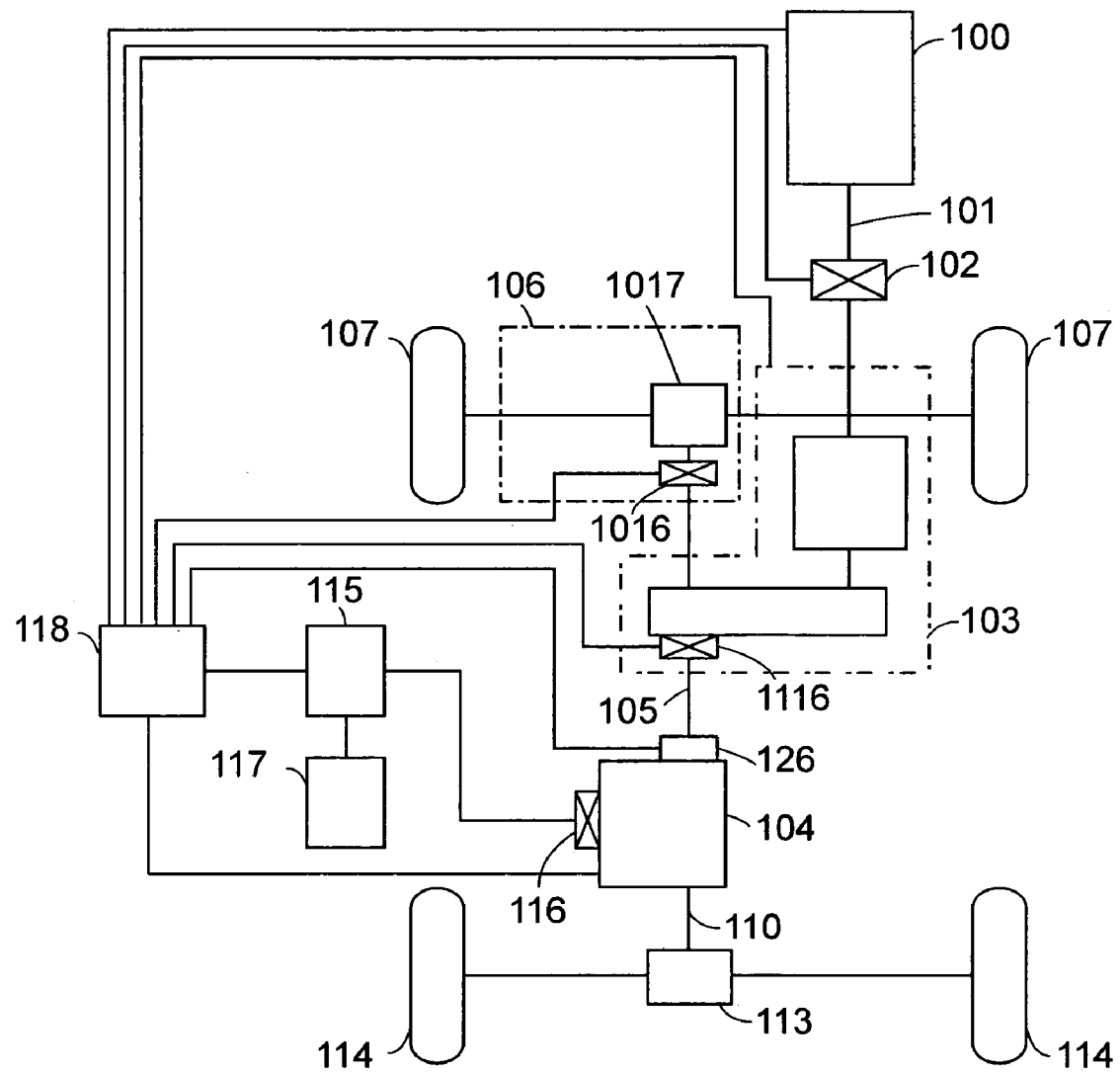
FIG. 1 is a block chart of a preferred embodiment of the present invention.

An energy storage type of differential mixed power distribution system of the present invention adapted to an all wheel driving (AWD) transportation means is essentially having an output end from an internal combustion engine (or any other revolving power source) to deliver revolving kinetics to drive a front-end load through an intermediate transmission and control interface device, and to transmit power to an input end of a storage type of differential mixed power device to drive a rear-end load through an output end of the storage type of differential mixed power device. The storage type of differential mixed power device includes an electromechanical unit provided with functions as a motor and as a generator, a three-end shaft differential wheel set, a rechargeable device, and a power control device. The three-end shaft differential wheel set includes two differential shafts and an input shaft. The input shaft is directly or indirectly through a transmission coupled to a rotation part of the electromechanical device, one differential shaft is coupled to the end for outputting revolving kinetics of the intermediation transmission and interface control device; and the other differential shaft drives a rear-end load or drive other load.

An optional brake is disposed between the shaft of the rotor and the case of the static part of the electromechanical device. The brake subject to a control device controls the status of closed or released between the shaft of the rotor and the case of the static part of the electromechanical device. With power inputted, the electromechanical device functions as a motor; or when driven by the revolving kinetics, functions as a generator to charge the rechargeable device or supply power to other load needed to be driven by power. A reverse torque is created from the current outputted from the electromechanical device when functioning as a generator to create differential damper at the three-end shaft differential wheel set or to execute regenerated braking.

As required, the electromechanical device is subject to the control by a central controller and a drive circuit device to execute revolution clockwise or counter-clockwise as a motor, or to execute regenerated braking as a generator. With the engine as the primary drive power, and rpm difference takes place due to changed road conditions or in case of driving on upward or downward slop or acute acceleration that warrants regulation of power distribution between the front-end and the rear-end loads, the electromechanical device from the differential mixed power device to function as a generator to charge the rechargeable device thus to control its charging power and further the reverse torque of the electromechanical device; and finally to complete the passive regulation of the power distribution between the front-end and the rear-end loads.

In excising the regulation of the power distribution between the front-end and the rear-end loads when rpm difference between both loads takes place due to changed road conditions, or the vehicle is driving on upward or downward slop, or executing acute acceleration, the electromechanical device may be subject to the control by the central controller and the drive circuit device to execute revolving output for driving the load alone, or jointly with the engine to drive both of the front-end and the rear-end loads at the same time by having the power from the rechargeable device to drive the electromechanical device to function as a motor engaging in revolution clockwise or counter-clockwise; or alternatively to execute active regulation of the power distribution between the front-end and the rear-end by taking advantage of the revolution clockwise or counter-clockwise of the motor.

The energy storage type of differential mixed power distribution system of the present invention provides all or a part of the following functions subject to the control device: (1) electric energy from a rechargeable device drives the electromechanical device adapted to the differential mixed power device to function as a motor for revolving together with the engine to drive the load, or to function as a motor to revolve clockwise or counter-clockwise in regulating the power distribution between the front-end and the rear-end loads; or (2) taking advantage of the rpm difference between two differential shafts in the differential mixed power device to drive the adapted electromechanical device to function as a generator for charging the rechargeable device, and further to control the size of the differential coupling torque by regulating the charging amperage for regulating the coupling function of rpm difference, and thus the torque distribution between loads respectively at the front end and the rear end; or (3) by having the power from the rechargeable device to drive the electromechanical device adapted to the differential mixed power device to function as a motor alone to provide revolution output to drive the load; or (4) in downward slope, exercising a brake or braking for deceleration, the electromechanical device adapted to the differential mixed power device functions as a generator to charge the rechargeable device or supply power to other power-driven load for executing the braking by regenerated power; or (5) the system drives only the front wheels; or (6) the system drives only the rear wheels.

Figure 2:
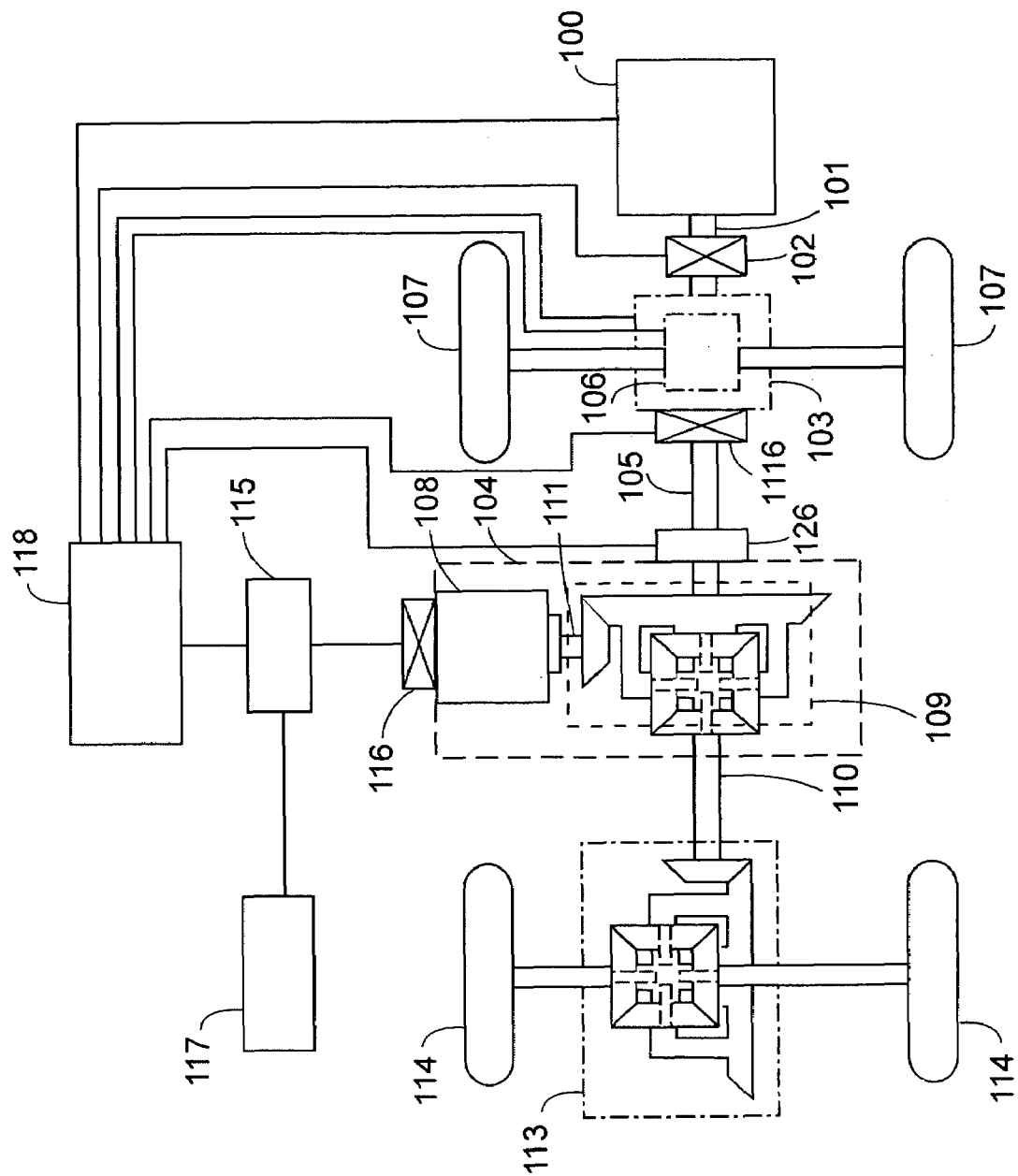
FIG. 2 is a schematic view showing a construction of a cut-away from FIG. 1 of the preferred embodiment of the present invention.

Referring to FIGS. 1, and 2 respectively for a schematic view of a preferred embodiment of the present invention and a schematic view showing a construction of a cut-away from FIG. 1, a preferred embodiment of the present invention is essentially comprised of:

a revolving power unit 100: comprised of an internal combustion engine or other revolution power source, a revolution output shaft 101, an optional clutch 102 or an intermediate transmission and control interface device 103 that provides gearshift function to drive a front-end load 107, and a differential shaft 105 of a differential mixed power device 104;

the intermediate transmission and control interface device 103: comprised of a conventional man-machine operation interface device including an automatic transmission or manual transmission or manually controlled automatic gearshift device and other clutch provided for gearshift to drive the front-end; the input end of the intermediate transmission and control interface device 103 receives the input of revolving kinetics from the revolving power unit 100 and one of its output end drives a front-end transmission device 106 to further drive the front-end load 107; and another output end of the intermediate transmission and control interface device 103 is provided for coupling the differential shaft 105 of the differential mixed power device 104 to transmit revolving kinetics for the other differential shaft 110 of the differential mixed power device 104 to couple to a rear-end load 114;

the differential mixed power device 104: comprised of an electromechanical device 108 incorporated with a three-end shaft differential wheel set 109 including two differential shafts 105, 110, a set of input shaft 111; the input shaft is directly or indirectly coupled through a transmission device to the electromechanical device 108, the differential shafts 105 is directly or indirectly coupled through a clutch 1116 to the revolving kinetics output end of the intermediate transmission and control interface device 103, and the other differential shaft 110 is coupled to the rear-end load 114 or drives other load. The three-end shaft differential wheel set 109 may be replaced with a planetary wheel set and a gear set may be also replaced with a friction transmission device or any other transmission;

the differential shaft 105: to output through the intermediate transmission and control interface device 103 with its rpm at the same ratio as or a different ratio from that of from the output shaft 101 of the revolving power unit 100;

the front-end transmission device 106: an optional item comprised of a conventional transmission mechanism to input the revolving kinetics from the intermediate transmission and control interface device 103 to further drive the front-end load 107; an optional differential wheel set 1017 may be adapted for both of the differential output ends of the differential wheel set 1017 to drive the front-end load 107; or alternatively, a transmission wheel set is provided to separately drive the load; or a controllable clutch 1016 is provided as required to transmit or cut off the revolving kinetics to drive the front-end load 107 from the intermediate transmission and control interface device 103;

the clutch 1016: related to an optional clutch device driven by manual, mechanical, electromagnetic or eccentric force, or comprised of a one-way transmission, disposed between the end to output revolving kinetics from the intermediate transmission and control interface device 103 and the differential wheel set 1017 subject to the manipulation by a central controller 118 to execute engagement or disengagement operation, so to couple to or to cut from the revolving kinetics between the front-end load 107 and the intermediate transmission and control interface device 103;

the clutch 1116: related to an optional clutch driven by manual, mechanical, electromagnetic, fluid, or eccentric force, or to a one-way transmission; disposed at where between the revolving kinetics output end of the intermediate transmission and control interface device 103 and the differential shaft 105 of the differential mixed power device 104 subject to the control by the central controller 118 for the intermediate transmission and control interface device 103 to engage with or disengage from the differential mixed power device 104;

a brake 116: related to an optional braking device with its braking function controllable by manual, mechanical, electromagnetic, or fluid force; disposed at where between the rotor and the static case of the electromechanical device 108;

a brake 126: related to an optional braking device with its braking function controllable by manual, mechanical, electromagnetic, or fluid force; disposed at where between the rotor and the static case of the differential shaft 105;

the electromechanical device 108: comprised of an AC, DC, brush, or brush-less electromechanical structure to execute the drive by being subject to the drive circuit device 115, the optional brake 116 is disposed at where between the shaft and the case of the static part of the rotor with the brake 116 subject to the control by the central controller 118 to further control the braking or releasing the braking between the rotor and the case of static part of the electromechanical device 108;

when powered, the electromechanical device 108 functions as a motor; and when driven by the revolving kinetics, it functions as a generator to charge the rechargeable device 117 or supply power to other load. A reverse torque is created from the current outputted by the electromechanical device so as to provide differential damper function at the three-end shaft differential wheel set coupled to the electromechanical device, or to provide regenerated braking function upon executing the braking. With the engine serving as the primary drive force and rpm differences takes place between the front-end and the rear-end loads due to changed road conditions, the electromechanical device 108 adapted to the differential mixed power device 104 functions as a generator to charge the rechargeable device, and the power so charged controls the reverse torque of the electromechanical device 108, thus to provide the passive regulation of the power distribution between the front-end and the rear-end loads; and if rpm difference takes place between the front-end and the rear-end loads due to changed road conditions, or driving on upward or downward slop, or applying acute acceleration that warrants the regulation of the power distribution between the front-end and the rear-end loads, the electromechanical device 108 for being subject to the central controller 118 and the drive circuit device 115 is driven by the power supplied from the rechargeable device 117 to revolve clockwise or counter-clockwise as a motor to separately output revolving kinetics to drive the load or jointly with the engine to drive both of the front-end load 107 and the rear-end load 114 at the same time; or provide active regulation of the power distribution between the front-end and the rear-end by taking advantage of the motor revolving clockwise or counter-clockwise;

the drive circuit device 115: related to a dynamo-electric or solid status electronic device; disposed at where between the electromechanical device 108 and the rechargeable device 117 to operate according to the command given by the central controller 118 to control the electromechanical device 108 to function as a motor to revolve clockwise or counter-clockwise, or to control the electromechanical device 108 to function as a generator for charging the rechargeable device 117 or outputting the power to other load while controlling the power distribution between the front-end and the rear-end loads by controlling the outputted power to create reverse torque at the electromechanical device 108;

the central controller 118: related to a dynamo-electric or solid status electronic device for outputting control commands to operate the drive circuit device 115;

the rechargeable device 117: related to a rechargeable secondary battery, capacitor, or super-capacitor;

the front-end load 107: related to a or a plurality of wheel set, track or other load driven through the intermediate transmission and control interface device 103 or further driven by the optional front-end transmission device 106; and the rear-end load 114: related to a or a plurality of wheel set, track or other load directly driven or driven through a transmission or a differential wheel set 113.

The differential regulation or power distribution between the front-end load 107 and the rear-end load 114 by the electromechanical device 108 adapted to the energy storage type of differential mixed power distribution system is provided including that the power supplied from the rechargeable device 117 drives the electromechanical device 108 to function as a motor revolving clockwise or counter-clockwise to provide active regulation of the rpm difference or power distribution between the front-end and the rear-end loads; or the electromechanical device 108 as driven by the revolving kinetics through the 3-end shaft differential wheel set 109 functions as a generator to charge the rechargeable device 117 or supply power to other power driven load, the output of power so generated creates reverse torque at the electromechanical device 108 to provide the function of creating differential damper at the 3-end shaft differential wheel set 109 coupled to the electromechanical device 108, thus to provide passive regulation of the rpm difference between the front-end load 107 and the rear-end load 114.

The energy storage type of differential mixed power distribution system of the present invention when applied in an All Wheel Driving carrier provides all or a part of the following functions through the operation of the intermediate transmission and control interface device 103 and the control by the central controller 118: (1) the power supplied from the rechargeable device 117 drives the electromechanical device 108 of the differential mixed power device 104 to function as a motor to drive the load by revolution together with the revolving power unit 100, or to revolve clockwise or counter-clockwise as a motor to regulate the power distribution between the front-end and the rear-end loads; or (2) when the revolving power unit 100 provides the drive of the primary power, both brakes 116 and 126 and the clutch 1116 are in disengaged status; by taking advantage of the rpm difference between two differential shafts 105, 110 of the differential mixed power device 104, the electromechanical device 108 is driven to charge the rechargeable device 117, and the power distribution between the front-end and the rear-end loads is regulated by controlling the size of the differential coupling torque through the control of the size of the charging amperage; or (3) with the brake 126 closed for braking, and the brake 116 released, the electromechanical device 108 of the differential mixed power device 104 is driven by the power from the rechargeable device 117 through the control by the drive circuit device 115 to separately execute the revolving output to drive the rear-end load 114; or (4) in the event that the carrier is driving on a downward slope, executing a brake, or an deceleration brake with the brake 126 closed for braking, the brake 116 released, the electromechanical device 108 adapted to the differential mixed power device 104 functions as a generator to charge the rechargeable device 117 or supply power to other load for executing a brake with regenerated power; or (5) with the clutch 1116 disengaged and the clutch 1016 closed, the revolving kinetics from the revolving power unit 100 drive the front wheels; or (6) with the clutch 1016 disengaged, the brakes 126 and 116 incorporated, the revolving kinetics from the revolving power unit 100 drive the rear wheels.

When applied in driving the carrier as described above, the front-end load 107 may be related to front wheels or rear wheels; and the rear-end load 114 may be related to any front wheel or rear wheel adapted in compliance with the definition of the front-end load 107.

In field application, the energy storage type of differential mixed power distribution system of the present invention drives both of the front and the rear wheel sets at the same time, or may only drive the front wheel set or the rear wheel set. Wherein:

the front wheel set includes one or a plurality of circular wheel, or any revolving wheel in a given geometric shape; and the rear wheel set includes one or a plurality of circular wheel, or any revolving wheel in a given geometric shape.

The wheel set described above includes a track structure.

Within the system of the present invention, clutches 102, 1016, 1116 and the brakes 116, 126 are all optional devices and the operating functions of the system are relatively increased or decreased. The inference of the increased or decreased functions is well known to those who are familiar with the art of the AWD, and thus will not be elaborated herein.

In conclusion, the energy storage type of differential power distribution system of the present invention may be applied in a vehicle, sea vessel or any other AWD carrier with fixed type of compound drive power. In field applications, peripherals for the output may be selected as applicable to give more flexibility in choosing the system required.

The invention claimed is:

1. A power distribution system for distributing revolving power to drive a transportation vehicle, comprising:

a power source for providing the revolving power;

a differential mixed power device for regulating a distribution of power between a front-end load and a rear-end load of the vehicle, and for outputting power to drive the rear-end load, the differential mixed power device including an electro-mechanical device coupled with a three-end shaft differential wheel set, wherein when the electro-mechanical device is driven by a revolutions-per-minute (RPM) difference of the front-end and rear-end loads, the electro-mechanical device functions as a generator to charge a rechargeable device and provides a passive regulation of the power distribution, and when the electro-mechanical device is powered by the rechargeable device, the electro-mechanical device functions as a motor that revolves clockwise or counter-clockwise to provide an active regulation of the power distribution;

a transmission and control interface device for transmitting the revolving power to the front-end load and the differential mixed power device;

a differential shaft, disposed between the differential mixed power device and the transmission and control interface device, and configured to output an RPM through the transmission and control interface device;

a front-end transmission device, disposed between the front-end load and the transmission and control interface device, including a conventional transmission mechanism to input revolving kinetics from the transmission and control interface device to drive the front-end load;

a drive circuit device, disposed between the electro-mechanical device and the rechargeable device, and configured to control the electro-mechanical device to function as a motor or a generator, and to control the output power to create a reverse torque at the electro-mechanical device for regulating the power distribution between the front-end and the rear-end loads, according to given control commands; and a central controller, configured to provide control commands to the drive circuit device.

2. The power distribution system of claim 1, wherein the front-end transmission device further includes a differential wheel set that is configured to drive a differential load via the two output ends of the differential wheel set.

3. The power distribution system of claim 1, wherein the front-end transmission device further includes a controllable clutch for transmitting or cutting off the revolving kinetics from the transmission and control interface device.

4. The power distribution system of claim 3, wherein the controllable clutch is one of a manual clutch, a mechanical clutch, an electromagnetic clutch, an eccentric force driven clutch, and a clutch with a one-way transmission means.

5. The power distribution system of claim 1, further including a clutch that is disposed between the differential shaft of the differential mixed power device and a revolving kinetics output end of the transmission and control interface device, and is configured to couple or cut off revolving kinetics between the differential mixed power device and the transmission and control interface device, the clutch being one of a manual clutch, a mechanical clutch, an electromagnetic clutch, an eccentric force driven clutch, and a clutch with a one-way transmission means.

6. The power distribution system of claim 1, further includes a brake that is disposed between a rotor and a static case of the electro-mechanical device, the brake being manipulated by one of a manual force, a mechanical force, an electromagnetic force, and a fluid force.

7. The power distribution system of claim 1, further includes a brake that is disposed between the differential shaft and a static case of the electro-mechanical device, the brake being manipulated by one of a manual force, a mechanical force, an electromagnetic force, and a fluid force.

8. The power distribution system of claim 1, further including:

a first clutch, disposed in the front-end transmission device, and configured to transmit or cut off the revolving kinetics from the transmission and control interface device;

a second clutch, disposed between the differential shaft of the differential mixed power device and a revolving kinetics output end of the transmission and control interface device, and configured to couple or cut off revolving kinetics between the transmission and control interface device and the differential mixed power device;

a first brake, disposed between the differential shaft and a static case of the electro-mechanical device; and a second brake, disposed between a rotor and a static case of the electro-mechanical device.

9. The power distribution system of claim 8, wherein the system provides at least one of the following functions through controls by the transmission and control interface device and the central controller:

(1) the rechargeable device provides power to drive the electro-mechanical device of the differential mixed power device, the electro-mechanical device functioning as a motor to drive the front-end or the rear-end load by revolving clockwise or counter-clockwise to regulate the power distribution between the front-end and the rear-end loads;

(2) when the power source provides driving power, both the first and second brakes and the second clutch are in a disengaged status; using a RPM difference between the differential shaft and another differential shaft disposed between the differential mixed power device and the rear-end load, the electro-mechanical device is driven to charge the rechargeable device; the power distribution between the front-end and the rear-end loads is regulated by controlling the reverse torque through a control of a charging amperage;

(3) with the first brake applied and the second brake released, the electro-mechanical device is driven by a power from the rechargeable device through a control from the drive circuit device;

(4) when the transportation vehicle is driving on a downward slope, with the first brake applied and the second brake released, the electro-mechanical device adapts to the differential mixed power device and functions as a generator to charge the rechargeable device or supply power for executing a brake with regenerated power;

(5) with the second clutch disengaged and the first clutch engaged, the revolving power from the power source drives the front-end loads; and (6) with the first clutch disengaged and the first and second brakes applied, the revolving power from the power source drives the rear-end loads.

10. The power distribution system of claim 1, wherein the differential power distribution between the front-end and the rear-end loads includes at least one of the following:

(1) power from the rechargeable device drives the electro-mechanical device to function as a motor revolving clockwise or counter-clockwise to provide an active regulation of the RPM difference, and an active regulation of the power distribution between the front-end and the rear-end loads;

(2) the electro-mechanical device, driven by the revolving power through the three-end shaft differential wheel set, functions as a generator to charge the rechargeable device, or supply power to other power driven loads; The supplied power creates a reverse torque at the electro-mechanical device, and provides differential damper at the three-end shaft differential wheel set coupled to the electromechanical device, thereby to provide passive regulation of the RPM difference between the front-end load and the rear-end load.

* * * * *